United States Patent [19]

Rohrbach et al.

[11] 3,985,263

[45] Oct. 12, 1976

[54] APPARATUS AND METHOD FOR METERING PARTICLES

[75] Inventors: Roger P. Rohrbach; Kun Ha Kim, both of Raleigh, N.C.

[73] Assignee: Research Corporation, New York, N.Y.

[22] Filed: Apr. 5, 1972

[21] Appl. No.: 241,328

[52] U.S. Cl. .................... 221/1; 221/278; 259/36; 302/26

[51] Int. Cl.[2] .................... B65G 51/02

[58] Field of Search .................... 221/278, 1; 302/21, 302/22, 25, 17, 26, 32; 259/4, 36

[56] References Cited

UNITED STATES PATENTS

| | | | |
|---|---|---|---|
| 1,616,547 | 2/1927 | Pontoppidan | 259/36 |
| 3,039,531 | 6/1962 | Scott | 221/278 X |
| 3,457,691 | 7/1969 | Rogge | 221/278 X |
| 3,637,108 | 1/1972 | Loesch et al. | 221/211 |
| 3,697,050 | 10/1972 | Stanley | 259/4 |

*Primary Examiner*—Robert B. Reeves
*Assistant Examiner*—David A. Scherbel
*Attorney, Agent, or Firm*—Cooper, Dunham, Clarke, Griffin & Moran

[57] ABSTRACT

Apparatus and method for metering particles involving circulating particles through a passage, retaining a particle in a particle retention chamber that is part of the passage, and ejecting the retained particle from the particle retention chamber. Particle circulation and retention and ejection are accomplished by fluid flows within the passage.

34 Claims, 8 Drawing Figures

Fig. 3.
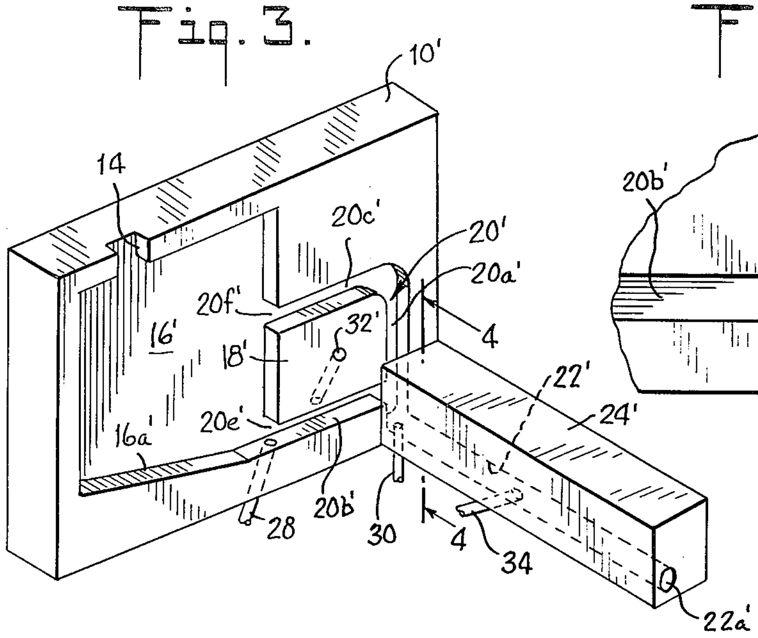
Fig. 4.
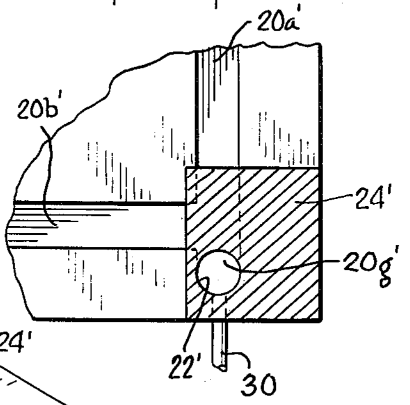
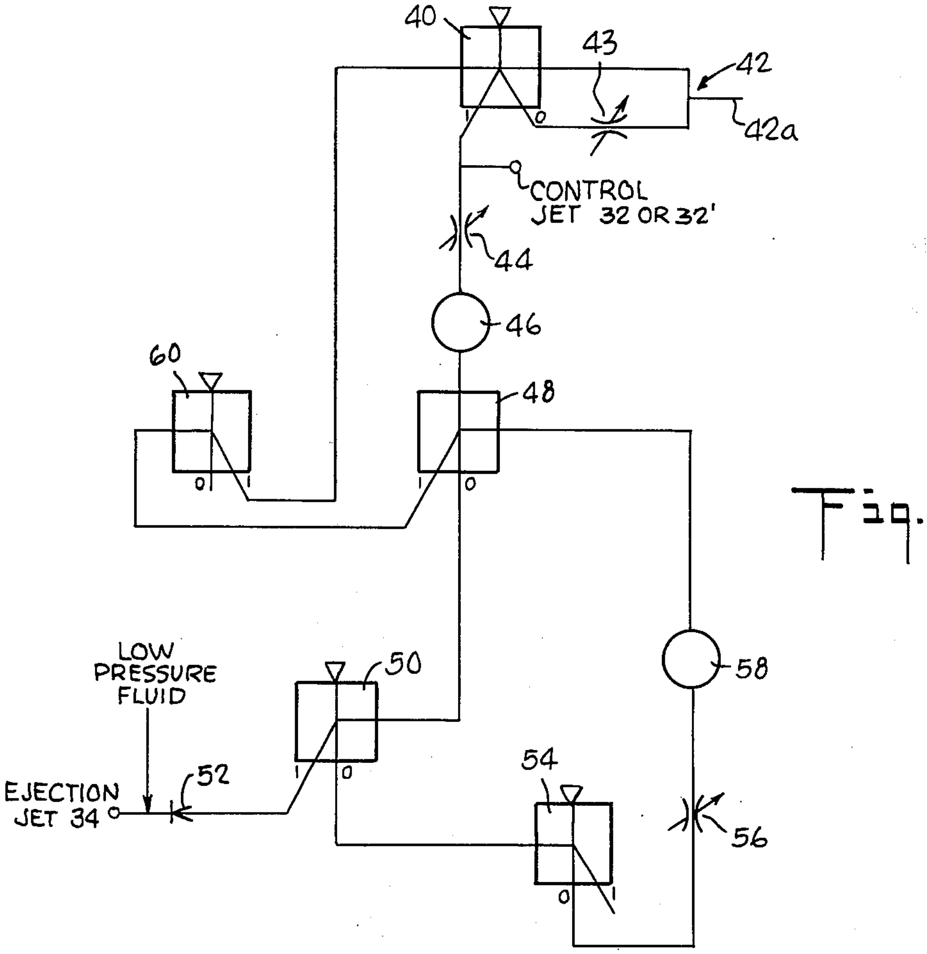
Fig. 5.

Fig. 6.
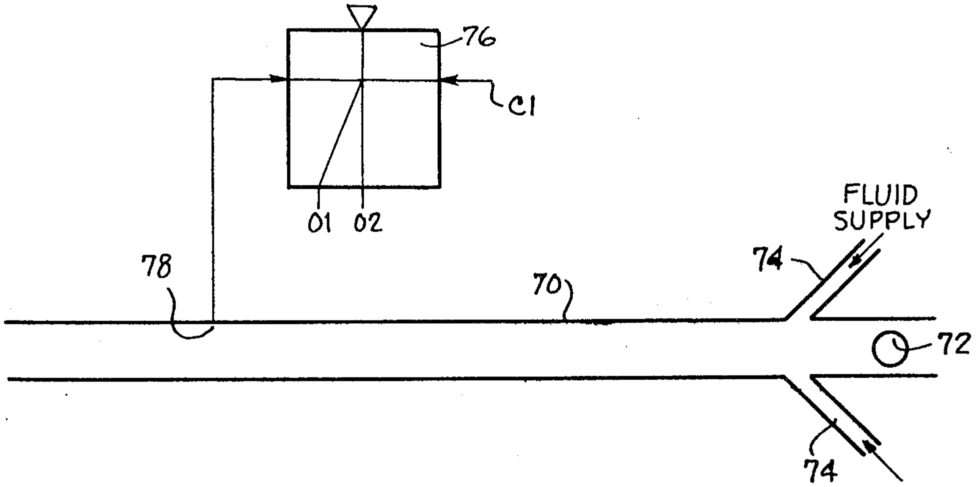
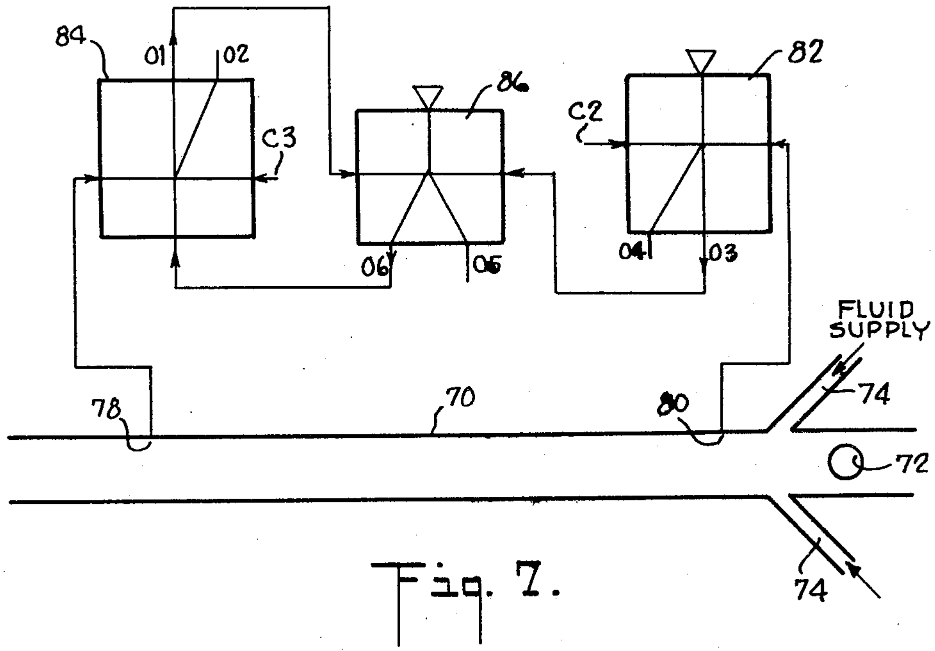
Fig. 7.

APPARATUS AND METHOD FOR METERING PARTICLES

BACKGROUND AND BRIEF DESCRIPTION OF THE INVENTION

This invention relates to the metering of particles, and more particularly to the controlled metering or dispensing of particles from a supply thereof. The invention finds particular application to the dispensing of individual seeds for planting purposes.

Particle metering, and in particular seed metering, has typically been accomplished in the past through mechanical means involving contact of the particles being metered by moving machine parts. Such contact is undesirable, especially in the field of seed metering. The present invention, accordingly, is directed to the metering of particles through the use of fluid flows, eliminating entirely the need for mechanically moving parts in contact with the particles.

The invention utilizes the circulation of particles through a circulation passage by fluid flow through the passage. A counterflow of fluid within the passage is utilized in part to retain a single particle within a particle retention chamber that forms a part of the passage. The retained particle is then ejected from the particle retention chamber through the use of fluid flow passing through an ejection passage that communicates with the particle retention chamber. By appropriate correlation of fluids applied to different zones of the circulation and ejection passages, the circulation and retention and ejection of particles may be easily achieved.

The ejection or dispensing of particles on a periodic basis may be achieved through periodic activation of one or more sources of fluid under pressure that provide for the fluid flows within the passages. Such periodic activation may, for example, be associated with the movement of a seed planter so that seeds are dispensed for planting based upon such movement. The dispensing of particles through the ejection passage may be monitored, so that if a seed, for example, is not dispensed on the periodic basis for some reason, then an additional ejection operation can be carried out to ensure the appropriate planting of seeds. Monitoring of the movement of a particle through the ejection passage may be achieved by detecting the pressure at one or more points in the ejection passage and noting pressure changes as produced by particles passing through the passage.

The following patents are representative of the prior art:

| U.S. Patent No. | Patentee(s) | Issued |
|---|---|---|
| 3,142,274 | Winter | 28 July 1964 |
| 3,201,062 | Mach et al. | 17 Aug. 1965 |
| 3,466,079 | Mammel | 9 Sept. 1969 |
| 3,504,945 | Leibundgut et al. | 7 Apr. 1970 |
| 3,556,604 | Round | 19 Jan. 1971 |

The invention will be more completely understood by reference to the following detailed description and the accompanying drawings.

BRIEF DESCRIPTION OF THE DRAWINGS

FIG. 3 is a perspective view of a particle metering system similar to that of FIG. 2;

FIG. 4 is a sectional view of part of the system of FIG. 3 (to an enlarged scale) showing the location of circulation passage segments and particle retention chamber;

FIG. 5 is a diagram of a fluid control system for the application of selected fluid pressures to the particle metering systems of FIGS. 2 and 3;

FIGS. 6 and 7 are schematic representations of systems for monitoring the passing of a particle through a passage;

DETAILED DESCRIPTION

Figure 1:
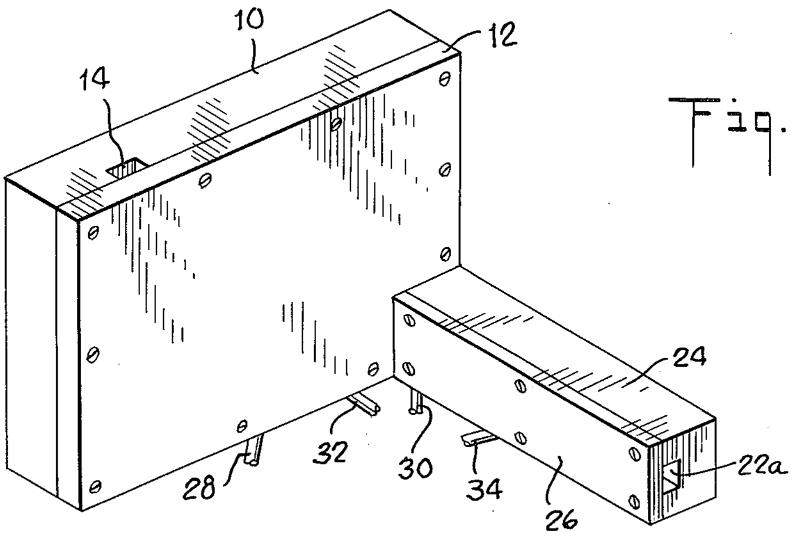
FIG. 1 is a perspective view of a particle metering system in accordance with the invention.
Figure 2:
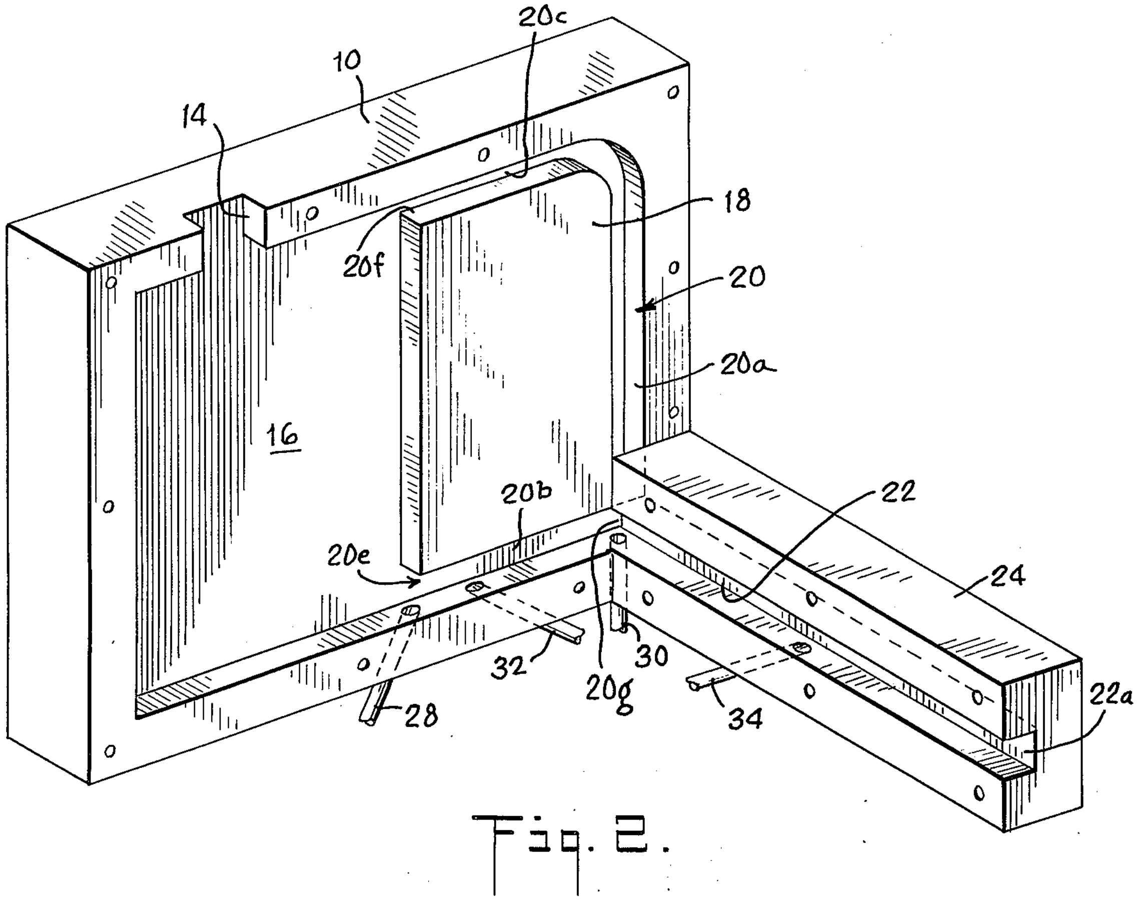
FIG. 2 is an enlarged perspective view of the system of FIG. 1 with cover plates removed.

FIGS. 1 and 2 show a particle metering system embodying the invention. The system shown was used for the metering of small plastic beads about 0.113 inch in diameter used to simulate seeds. The metering system includes a housing 10 closed by a cover 12 shown in FIG. 1. An opening 14 provides access to a particle storage chamber 16 within the housing. Particles such as seeds are applied to the storage chamber 16 through the opening 14. The primary reason for opening 14, however, is to provide a vent for the spent fluid from the various internal jets.

A block-type structure 18 is included within the housing 10 and spaced from the walls thereof so as to define a particle circulation passage 20. The passage 20 includes a first vertical segment 20*a*, a second horizontal segment 20*b* and a final horizontal segment 20*c*. The entrance to the circulation passage 20 is designated 20*e* in FIG. 2, while the exit from the circulation passage is designated 20*b* in FIG. 2. Particles within the storage chamber 16 are made to circulate through the circulation passage 20 via the entrance 20*e* and exit 20*f* as explained in more detail below.

The joinder of the circulation passage segments 20*a* and 20*b*, designated 20*g* in FIG. 2, constitutes a particle retention chamber. Communicating with that chamber is an ejection passage 22. The ejection passage 22 is defined by a housing 24 and cover plate 26. A particle retained within the particle retention chamber 20*g* is ejected from that chamber, as will be explained in more detail below, through the ejection passage 22.

To carry out the circulation, retention and ejection of particles, a series of fluid jets is employed, namely, a feeding jet 28, a power jet 30, a control jet 32 and an ejection jet 34. The feeding jet 28 directs a fluid (for example, air) generally into the region of the entrance 20*e* of the circulation passage 20. The jet 28 may be angled, as shown, so that the fluid therefrom flows generally into the entrance 20*e*. The purpose of the jet 28 is to agitate the particles within the storage chamber 16 to prevent blockage of the circulation passage entrance 20*e* and also to promote the feeding of particles through that entrance into the circulation passage. The power jet 30 directs fluid upwardly through the particle retention chamber 20*g* and into the vertical circulation passage segment 20*a*. The power jet 30 may introduce fluid at a higher pressure than the feeding jet 28, and is for the purpose of circulating particles through the circulation passage 20, i.e., so that a continuously circulating flow of particles enters into the circulation passage entrance 20*e* and exits from the passage through exit 20*f*.

In order to retain a single particle in the particle retention chamber 20*g*, it is necessary to counteract the fluid flow within the circulation passage 20 as caused by the power jet 30 and feeding jet 28. In particular, fluid flows through the particle retention chamber 20*g* carrying particles through the retention chamber during the circulation of particles through the circulation passage 20. The particle retention chamber 20*g* receives fluid flow from both the circulation passage segment 20*b* and from the ejection passage 22. To counteract these latter flows, the control jet 32 and the ejection jet 34 are employed. Specifically, the control jet 32 supplies fluid under pressure into the circulation passage segment 20*b* in a direction so as to flow away from the particle retention chamber 20*g* toward the circulation passage entrance 20*e*. The ejection jet 34 supplies fluid under pressure to the ejection passage 22 in a direction so as to flow from the particle retention chamber 20*g* outwardly toward mouth 22*a* of the ejection passage. By appropriate selection of the pressures applied to the control and ejection jets 32 and 34, with respect to the pressures of the feeding and power jets 28 and 30, the circulation of particles through the circulation passage 20 may be caused to cease, and a single particle to be retained within the particle retention chamber 20*g*. In order to eject the particle retained within the retention chamber 20*g*, a somewhat higher pressure is momentarily applied to the ejection jet 34.

In operation, the feeding and power jets 28 and 30 may be continuously supplied with fluid under fixed pressures. The ejection jet 34 may be normally supplied with fluid under a first relatively low pressure. During the application of such pressures, and with no pressure being supplied to the control jet 32, particles are circulated from and to the particle storage chamber 16 via the circulation passage 20. At such time as it is desired to retain a single particle within the particle retention chamber 20*g*, a suitable pressure is applied to the control jet 32. The fluid flow from this jet acts, as described above, along with the fluid flow at normally low pressure from the ejection jet 34 to retain a particle within the retention chamber 20*g* and to halt particle circulation. It has been observed that the last particle in a stream of particles in passage segments 20*a* and 20*b* is retained in the retention chamber 20*g*. Following retention of a particle, the ejection jet 34 is switched momentarily to its higher pressure state in order to carry out the ejection of the retained particle from the retention chamber 20*g* and through the ejection passage 22. Following particle ejection, the pressure may be removed from the control jet 32 and the ejection jet 34 may be returned to its lower pressure state in order to resume the circulation of particles though the circulation passage 20.

A particle metering system similar to that shown in FIGS. 1 and 2 is illustrated in FIG. 3. Like reference numerals have been employed in FIG. 3 to designate parts of the apparatus that are the same as shown in FIGS. 1 and 2. Primes have been employed in the numeral designations in FIG. 3 to designate parts that correspond to the similar numbered parts in FIGS. 1 and 2. The major features of change in the particle metering system of FIG. 3 are as follows. Lower wall 16*a'* of the particle storage chamber 16' is inclined to provide a better movement of particles within the storage chamber toward the entrance 20*e'* of the circulation passage 20'. The vertical segment 20*a'* of the circulation passage has been shortened to reduce the overall length of the circulation passage. Control jet 32' is applied to the upper portion of the circulation passage segment 20*b'* (through the block 18'). In the embodiment of FIG. 2 the control jet 32 communicates with the lower portion of the circulation passage 20*b* through the lowermost part of the housing 10. In both cases, however, fluid flow from the control jet is toward the entrance (20*e* and 20*e'*) of the circulation passage. As illustrated in FIG. 3, the ejection passage 22' is of circular cross-section and is lowered somewhat from the position shown in FIG. 2 so as to cause a corresponding lowering of the particle retention chamber 20*g'* (see FIG. 4). Lowering the particle retention chamber has been found to provide somewhat better particle retention within that chamber. The operating of the system of FIG. 3 is otherwise the same as that of FIGS. 1 and 2.

FIG. 5 schematically illustrates a fluid control system for the application of suitable fluid pressures to the control jet 32 (FIG. 2) or 32' (FIG. 3) and the ejection jet 34 (FIGS. 2 and 3). The feeding and power jets 28 and 30 of FIGS. 2 and 3 are continuously supplied with fluid under pressure, and the fluid sources are not shown in FIG. 5. Standard fluidic symbols have been employed in FIG. 5 (as well as in FIGS. 6–8 to be described below). In FIG. 5, flip-flop 40 is normally in the "0" state. In this state of the flip-flop, the control jet 32 or 32' as the case may be receives no fluid pressure. The ejection jets 34 of these systems receive low pressure fluid directly as shown in the lower portion of FIG. 5. Under these conditions circulation of particles takes place through the circulation passages 20 and 20' in the systems of FIGS. 1–3.

When it is desired to retain a particle within the retention chamber 20*g* or 20*g'*, the normally open end 42*a* of a Tee 42 is momentarily closed, applying pressure from the normally active "0" output and through restriction 43 to one input of the flip-flop and switching the flip-flop 40 so that its output is in the "1" state. Such "1" state of the flip-flop 40 provides fluid under pressure to the control jet 32 or 32', thereby causing the circulation of particles to cease and a single particle to be retained in the particle retention chamber, as described above.

Following the switching of the flip-flop 40 to its "1" state (at a later time determined by flow restriction 44 and capacitor 46), gate 48 (an OR-NOR gate) is activated in the "0" state. Such activation of gate 48 immediately switches gate 50 from its normally "0" state to the "1" state. In the "1" state of gate 50, fluid under a relatively high pressure is applied through a fluid diode 52 to the ejection jet 34, causing the ejection of the retained particle from the retention chamber, as described above. In this connection, the diode 52 is to prevent feeding back into gate 50 the low pressure fluid normally applied to the ejection jet 34.

The switching of gate 50 from its "0" state to its "1" state immediately switches gate 54 to its "0" state (gate 54 normally is in its "1" state). A short time after gate 54 has been switched to its "0" state, as controlled by flow restriction 56 and capacitor 58, gate 48 is switched back to its "1" state. The switching of gate 48 back to its "1" state returns gate 50 to its "0" state, removing high pressure from the ejection jet 34. The switching of gate 48 to its "1" state is amplified by a fluid gate 60 whose "1" output is applied to flip-flop 40 to switch that flip-flop back to its "0" state, thereby removing pressure from control jet 32 or 32' and completing the control cycle. The cycle may be repeated to carry out the retention and ejection of a particle by momentarily closing the opening end 42*a* of the Tee 42, as described above.

FIGS. 6 and 7 schematically illustrate two representative systems for the detection of the movement of a particle through a passage, such as the ejection passage 22 shown in FIG. 2 or the ejection passage 22' shown in FIG. 3. These monitoring or detection systems are useful for control purposes as well as simply monitoring the operation of a particle metering system. The system of FIG. 6 operates to detect movement of a particle past a reference point by noting a pressure increase at the point, while the system of FIG. 7 operates on the detection of a pressure decrease.

Referring to FIG. 6, a passage 70 is shown through which particles pass (as represented by particle 72). The passage is supplied with fluid through fluid inlets 74 for the purpose of causing movement of the particles through the passage. A fluid Schmitt trigger 76 is employed, having one input connected to point 78 in the passage 70 to detect movement of particle 72 past the point 78. The Schmitt trigger is supplied with a control pressure designated C1 in FIG. 6. The control pressure C1 is established so that it is normally slightly higher than the input pressure from point 78 for those times except when a particle 72 is approaching point 78. When a particle 72 is approaching the point 78 (up to the time that the particle reaches the test point) the input pressure at that point increases and becomes slightly higher than the control pressure C1. As the pressure at point 78 becomes higher than the control pressure C1, the Schmitt trigger changes state (for example, from "01" to "02"). This changing of state of the Schmitt trigger 76 may be used to provide an output signal (from one of the outputs "01" and "02") used for monitoring and/or control purposes.

As noted the control pressure C1 is established so that it is exceeded by the pressure at the other input to the Schmitt trigger 76 as a particle approaches the test point 78. As the particle passes through the test point, the pressure at the test point decreases. The pressure decrease may also be employed to detect passage of the particle past the test point, and a system for detecting such a pressure decrease is shown in FIG. 7.

Because there were other pressure decreases at the point 78 (due to experimental procedures) besides those occurring when particles pass the test point 78, the system of FIG. 7 employs a sensing of pressure at an upstream test point 80 as well as the principal test point 78. A fluid Schmitt trigger 82 has one input coupled to the point 80, while another Schmitt trigger 84 has an input coupled to the test point 78. A control pressure C2 is applied to the other input of the Schmitt trigger 82, and is established so that it is slightly less than the pressure normally encountered at the point 80 in the passage 70 when the particle 72 is stationary (the particle 72 was mechanically restrained in the position shown in FIG. 7 and then released in experiments that were conducted). Accordingly, the Schmitt trigger 82 is normally in the state in which its "04" output is active. After particle 72 is released and passes by the point 80 in the passage 70, the pressure at that point momentarily decreases until it is less than the control pressure C2, thereby momentarily switching the Schmitt trigger so that its output is in the "03" state. This state of the Schmitt trigger 82 activates the "06" output of flip-flop 86 (this flip-flop is normally in a state such that its "05" output is active). The active "06" output from the flip-flop 86 is applied to power the Schmitt trigger 84. This trigger has a control pressure C3 applied thereto which is normally slightly less than the pressure applied to the trigger from the test point 78 after particle 72 passes point 80. Accordingly, the active input pressure from the flip-flop 86 is channeled to the "02" output of the Schmitt trigger 84. As the particle 72 passes through the test point 78, the pressure at that test point is momentarily lowered below the control pressure C3, thereby momentarily switching the Schmitt trigger 84 and channeling the active input pressure from the flip-flop 86 to the "01" output of the Schmitt trigger. The changing of the state of the Schmitt trigger 84 may be utilized (from one of the outputs "01" and "02") in a detection and/or control process. The changing state of the Schmitt trigger 84 (the activation of the "01" output) is utilized to reset the flip-flop 86 through the coupling of the "01" output of the Schmitt trigger to the flip-flop. This returns the system of FIG. 7 to its original state, ready for the detection of the passage of another particle past the test point 78.

Broadly, the system of FIG. 7 may be viewed as involving the sensing of a pressure change at point 80 to condition the Schmitt trigger 84 so that a subsequent pressure change detected at the point 78 may be noted. Without the conditioning step, fluctuations of pressure at test point 78 would create erroneous outputs from the Schmitt trigger. If such fluctuations do not occur, then a simple detection system as shown in FIG. 6 would be suitable with the control pressure C1 set so that it is less than the normal pressure at the point 78, so that as a particle passes by the test point and the pressure is momentarily reduced, such pressure reduction will be detected by a changing of state of the Schmitt trigger.

Figure 8:
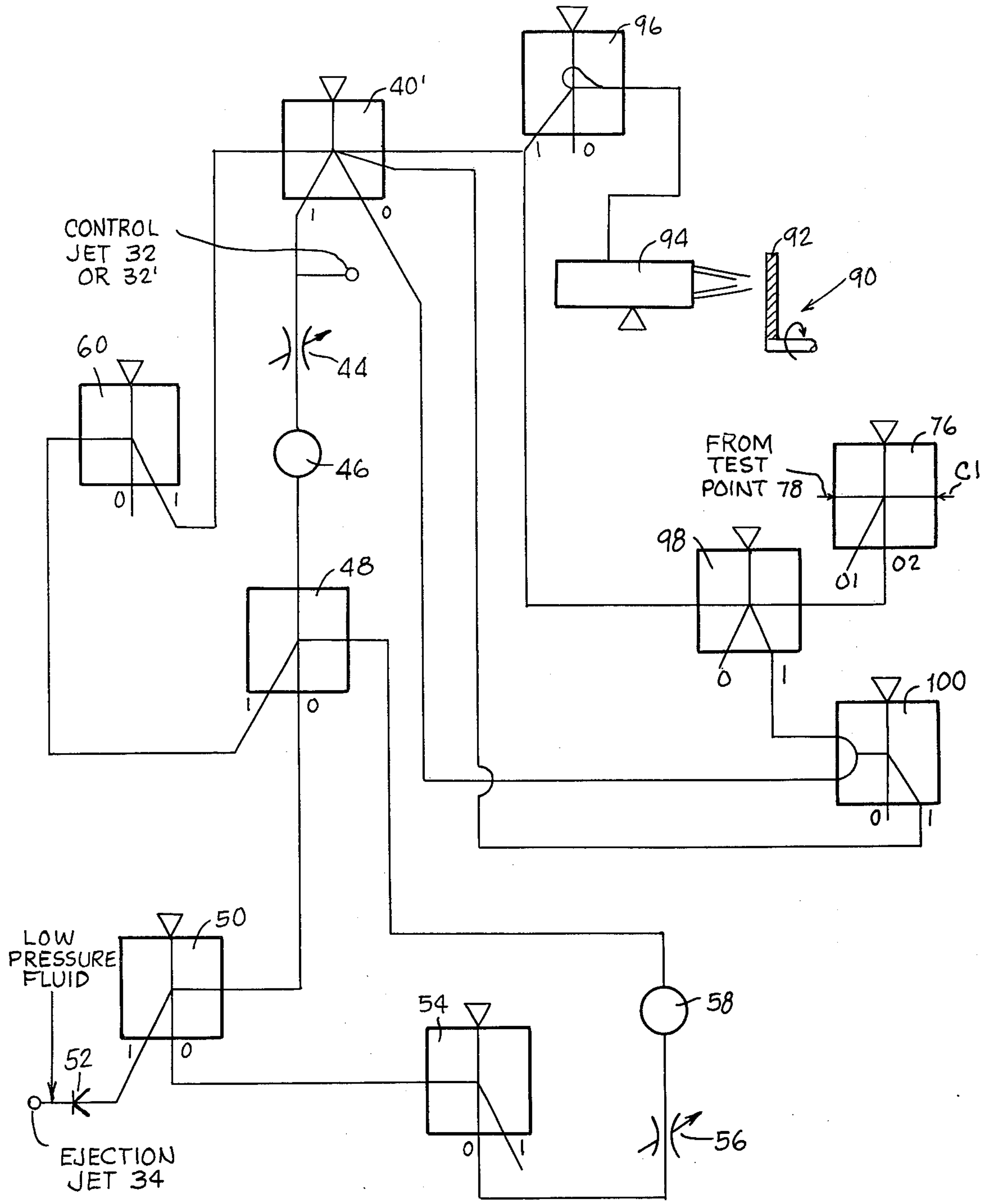
FIG. 8 is a schematic diagram of a fluid control system for use in conjunction with the particle metering systems of FIGS. 2 and 3 and useful in the planting of seeds, for example.

The system of FIG. 8 utilizes the control system of FIG. 5 and the particle detection system of FIG. 6 for the purpose of controlling a particle metering system such as shown in FIG. 2 or FIG. 3. The same reference numerals used in FIGS. 5 and 6 have been employed in FIG. 8 to designate like components. The system of FIG. 8 provides for the periodic ejection of a particle from a particle metering device, as well as the monitoring of particle ejection and control of particle metering to supply a missed particle in the event of ejection failure at any time. The system of FIG. 8 is suited for the planting of seeds, for example, and to this end utilizes a toothed wheel 90 having a plurality of teeth (only one of which, 92, is shown). A proximity sensor 94 (a cone-jet sensor) senses the passage of each tooth 92 past the sensor. The toothed wheel is rotated with a predetermined angular velocity, which may be proportional to the ground speed of a seed planter (not shown), for example. As the tooth 92 moves past the proximity sensor 94, a fluid signal is generated that is applied to a fixed one-shot 96 which is normally in the "0" state and which changes its state momentarily so that its "1" output is activated. The active "1" output from the one-shot 96 switches the flip-flop 40' (normally in the "0" state) to its "1" state. The flip-flop 40' corresponds to the flip-flop 40 shown in FIG. 5. As described above with reference to FIG. 5, the switching of the flip-flop 40' provides for the application of pressure to the control jet 32 or 32' and the subsequent application of high pressure to ejection jet 34, all to achieve the retention and subsequent ejection of a particle (seed) from the retention chamber 20*g* or 20*g'*.

As noted above, the Schmitt trigger 76 is employed to detect the passage of a particle past the test point 78 in a passage. In this case the test point 78 would be located near the exit of the ejection passage (somewhere near the exit 22*a* in FIG. 2 or 22*a'* in FIG. 3). The Schmitt trigger 76 is normally in the state in which its "01" output is active. Upon the passage of a particle (seed) past the test point 78, indicating a successful dispensing of a particle, the Schmitt trigger 76 is changed momentarily to the state in which its "02" output is active. The active "02" output from the Schmitt trigger 76 conditions flip-flop 98 so that its "0" output is active, thereby ensuring that one of two enabling inputs of AND gate 100 is inactive. Accordingly, the AND gate 100 is in the state in which its "0" output is active.

If a seed is not ejected from the retention chamber and does not pass the test point 78 for some reason, no seed detection will take place and the "01" output of the Schmitt trigger 76 remains active. The flip-flop 98 is in the state in which its "1" output is active, by virtue of a signal received from the one-shot 96 (upon activation of that output, as described above, by the signal from the sensor 94). Accordingly, the active "1" output from the flip-flop 98 enables one input of the AND gate 100. The other input to the AND gate 100 is derived from the "0" output from the flip-flop 40'. This output is active following the control cycle described above in which the ejection jet 34 is supplied with a high pressure to provide for the ejection of a particle (seed). As described above in connection with FIG. 5, following the application of such high pressure to jet 34, the gate 60 reconditions the flip-flop 40' so that its "0" output is active. The active "0" output from the flip-flop 40' provides the other enabling input to the AND gate 100. When both enabling inputs are active, the AND gate 100 is in the state in which its "1" output is active. This output is coupled to the flip-flop 40' and, hence, serves to initiate another cycle in which the control jet 32 or 32' has pressure applied thereto for the retention of a particle in the retaining chamber 20*g* or 20*g'* followed by the application of high pressure to the ejection jet 34 for the ejection of that particle.

Thus, the system of FIG. 8 provides for the periodic retention and ejection of particles (by virtue of the timing device 90) and also for the ejection of a particle in the event that ejection on the periodic basis is absent for some reason (by use of the particle detector 76).

It should be noted that while the detector 76 of FIG. 6 has been shown in the system of FIG. 8, the detector of FIG. 7 would be also suitable, as well as any other detector that detects the movement of a particle past a test point.

The embodiments of the invention disclosed above are presently preferred, and should be understood as being representative. The following data are from working models that were constructed for the purpose of metering small plastic beads about 0.113 inch in diameter used to simulate seeds. With reference to FIG. 2, passages were 5/32 inch square in cross-section. Control and ejection jets were 0.040 inch in diameter, while power and feeding jets were 0.025 inch in diameter. The supply pressures to the power and feeding jets were respectively 4.4 and 2.0 psig. The supply to the control jet was 2.3 psig, while the ejection jet was supplied with 0.9 and 6.0 psig in its low and high pressure states, respectively. The dimensions of the housing 10 were approximately 4 inches by 5 inches by ⅞ inch, while the dimensions of the housing 24 were approximately 1½ inches by 2 inches by 1¼ inches. The dimensions of the block 18 in FIG. 2 were approximately 3¾ inches by 1¾ inches by 5/32 inch, while the dimension of block 18' in FIG. 3 were approximately 1 inch by 1 inch by 5/32 inch. In both embodiments as shown in FIGS. 2 and 3, the feeding and control and ejection jets were all angled at approximately 45 degrees with respect to the passages to which the jets were coupled.

Fluid devices for the circulation of particles, the retention of a particle and its ejection as well as the monitoring of particle ejection and control therefrom have been disclosed. The method and apparatus disclosed are subject to modification. Accordingly, the invention should be taken to be defined by the following claims.

We claim:

1. A particle metering system comprising a passage, means for causing a circulating flow of particles through said passage, dispensing mean for dispensing particles from an intermediate part of said passage, first control means for periodically activating said dispensing means to cause the periodic dispensing of particles, means for monitoring the dispensing of particles, and second control means responsive to said first control means and to said monitoring means for activating said dispensing means upon the failure of said dispensing means to dispense a particle after the activation of said dispensing means by said first control means.

2. A system according to claim 1, particularly suited for the planting of seeds, in which said first control means includes means for dispensing seeds on a basis related to the movement of a seed planter.

3. A particle metering system comprising a passage, means for causing a circulating flow of particles through said passage, and means for ceasing said circulating particle flow and retaining a particle in a part of said passage, including a second passage joined to the first-mentioned passage at the part thereof in which said particle is retained, and means for ejecting said particle from said passage part through said second passage, in which said first-mentioned passage has an entrance and an exit connected to a particle storage chamber, and said flow causing means causes a circulation of particles from said chamber and through said entrance into said first-mentioned passage and thence through said exit to be returned to said chamber, in which said flow causing means comprises means for passing a fluid through said first-mentioned passage, and in which said ceasing and retaining means comprises means for passing a counter flow of fluid through at least a part of said first-mentioned passage.

4. A system according to claim 3, in which said ejecting means comprises means for passing a fluid through said second passage.

5. A system according to claim 4, including means for periodically actuating both said means for passing said counter flow of fluid and said means for passing fluid through said second passage.

6. A system according to claim 5, including means for detecting the movement of particles through said second passage, and means responsive to the absence of a particle exiting from said second passage for actuating the two last-mentioned means in claim 5.

7. A system according to claim 6, in which said detecting means comprises means responsive to the pressure at one or more points in said second passage.

8. A particle metering system comprising a passage, means for causing a flow of particles through said passage, and means for ceasing said particle flow and retaining a particle in a part of said passage, including a second passage joined to the first-mentioned passage at the part thereof in which said particle is retained, and means for ejecting said particle from said passage part through said second passage, in which said first-mentioned passage includes two segments substantially at right angles to each other, and said second passage is substantially at right angles to said passage segments.

9. A system according to claim 8, in which said flow causing and ejecting means comprise a first fluid jet for causing fluid flow in one passage segment in the direction of particle flow, a second fluid jet in the other passage segment for causing fluid flow against the direction of particle flow, and a third fluid jet for causing fluid flow in the second passage in the direction of particle flow therein.

10. A particle metering system comprising a first passage formed from two segments substantially at right angles to each other, and an ejection passage communicating with the first passage at the joinder of said two segments, a high pressure jet for causing a flow of fluid through one of said passage segments away from said joinder region, a low pressure jet for causing a flow of fluid in the second one of said segments away from said joinder region, and a third pressure jet for causing a flow of fluid in said ejection passage away from said joinder region, said third pressure jet having low and high pressure capabilities.

11. A system according to claim 10, including a chamber for particle storage communicating with said first and second passage segments, and a fourth jet for causing a fluid flow within said chamber to move said particles within said chamber.

12. A system according to claim 11, in which the first-mentioned one of said passage segments is substantially vertical while the second one of said segments is substantially horizontal, and said ejection passage is substantially horizontal and positioned below said joinder of said two passage segments.

13. A system according to claim 11, in which the first-mentioned one of said passage segments is substantially vertical while the second one of said segments is substantially horizontal, and said ejection passage is substantially horizontal and positioned substantially at the same level as said joinder of said two passage segments.

14. A particle metering system comprising a particle storage chamber for holding a plurality of particles, a circulation passage having an entrance for receiving particles from said particle storage chamber and an exit for discharging particles back into said particle storage chamber, a part of said circulation passage comprising a particle retention chamber, first fluid flow means for causing a first flow of fluid through at least a part of said circulation passage which first flow circulates particles from and to said particle storage chamber via said circulation passage, and second fluid flow means for causing a second flow of fluid through at least a part of said circulation passage which second flow causes a particle to be retained in said particle retention chamber and the circulation of particles through said circulation passage to cease.

15. A system according to claim 14, including an ejection passage communicating with said particle retention chamber for ejecting a particle retained within said particle retention chamber.

16. A system according to claim 15, including third fluid flow means for causing a third flow of fluid through said particle ejection passage to discharge a particle retained within said retention chamber.

17. A system according to claim 16, including fourth fluid flow means for causing fluid flow within said particle storage chamber to move said particles within said chamber and to aid in the circulation of particles through said circulation passage.

18. A system according to claim 16, including means for periodically activating said second fluid flow means.

19. A system according to claim 18, in which said third fluid flow means causes said third fluid flow at one of low and high pressures, said third fluid flow normally being at said low pressure, and control means for controlling said third fluid flow means to switch said third fluid flow from said low pressure to said high pressure following each periodic activation of said second fluid flow means to discharge said particle retained within said retention chamber through said ejection passage.

20. A system according to claim 19, in which said particles are seeds and which is particularly suited for the planting of seeds, and in which said periodic activating means includes means responsive to the movement of a seed planter to coordinate the periodic activation of said second fluid flow means to the movement of the planter.

21. A system according to claim 20, including means for sensing the movement of seeds through said ejection passage.

22. A system according to claim 21, in which said seed passage sensing means comprises means for detecting a change in fluid pressure at one or more zones in said ejection passage.

23. A system according to claim 22, in which said pressure changing detection means comprises first means coupled to a first zone within said ejection passage for detecting a change in fluid pressure at said first zone, second means positioned at a second zone within said ejection passage upstream from said first zone for detecting a change in fluid pressure at said second zone, and means jointly responsive to said first and second means for generating an output signal representative of the movement of a seed through said first zone.

24. A system according to claim 23, in which said second means includes means for providing a first signal upon the detection of a change in fluid pressure at said second zone, and said jointly responsive means comprises gating means for gating said first signal to generate said output signal upon the detection by said first means of a change in fluid pressure at said first zone.

25. A system according to claim 22, including means jointly responsive to said periodic activating means and said seed passage sensing means for activating said second fluid flow means upon the absence of the detection of a seed passing through said ejection passage following the activation of said second fluid flow means by said periodic activating means.

26. A system for detecting the movement of a fluid-entrained particle past a first zone in a passage, comprising first means coupled to said zone for detecting a change in fluid pressure at said first zone, second means positioned at a second zone in said passage upstream from said first zone for detecting a change in fluid pressure at said second zone, and means jointly responsive to said first and second means for generating an output signal representative of the movement of a particle through said first zone.

27. A system according to claim 26, in which said second means includes means for generating a first signal upon the detection of a change in fluid pressure at said second zone, and said jointly responsive means comprises gating means for gating said first signal to generate said output signal upon the detection by said first means of a change in fluid pressure at said first zone.

28. A method of metering particles comprising causing a circulation flow of particles, periodically dispensing particles from said circulating flow, monitoring the dispensing of particles, and causing the dispensing of a particle from said flow upon the detected failure of a particle being dispensed on the periodic basis.

29. A method of metering particles comprising causing a circulating flow of particles through a passage, and ceasing the particle flow and retaining a particle in a part of the passage, including ejecting said retained particle from said passage part, in which the flow of particles through the passage is caused by passing a fluid through said passage, and in which the particle flow within the passage is ceased and a particle is retained in said part of said passage by passing a counterflow of fluid through at least a part of the passage.

30. A method of metering particles, comprising storing particles within a storage chamber, circulating particles from the chamber and through a circulation passage from whence the particles are returned to the chamber by passing a first flow of fluid through at least a part of the circulation passage, and passing a second counterflow of fluid through at least a part of the circulation passage to cause a particle to be retained in a part of the circulation passage and the circulation of particles through the circulation passage to cease.

31. A method according to claim 30, in which the retained particle is ejected from said part of said passage by causing a third flow of fluid from said passage part through an ejection passage that communicates with said first-mentioned passage part.

32. A method of detecting the movement of a fluid-entrained particle past a first zone in a passage, comprising detecting a change in fluid pressure at said first zone, detecting a change in fluid pressure at a second zone in said passage upstream from said first zone, and, in joint response to the detected changes in pressures at the first and second zones, generating an output signal representative of the movement of a particle through said first zone.

33. A particle metering system comprising a passage, means for causing a flow of particles through said passage by passing a fluid through said passage, and means for ceasing said particle flow and retaining a particle in a part of said passage by passing a counter flow of fluid through at least a part of said passage.

34. A method of metering particles comprising causing a circulating flow of particles through a passage by passing a fluid through said passage, and ceasing the particle flow and retaining a particle in a part of the passage by passing a counterflow of fluid through at least a part of the passage.

* * * * *